(12) United States Patent  
Saharan et al.

(10) Patent No.: US 11,712,848 B2
(45) Date of Patent: Aug. 1, 2023

(54) MODIFYING A BUILDING SPACE IN AN APPARATUS FOR POWDER BED ADDITIVE MANUFACTURING A THREE-DIMENSIONAL OBJECT

(71) Applicant: EOS of North America, Inc., Novi, MI (US)

(72) Inventors: Ankit Saharan, Novi, MI (US); Erling Richard LaSalle, Novi, MI (US)

(73) Assignee: EOS of North America, Inc., Novi, MI (US)

( * ) Notice: Subject to any disclaimer, the term of this patent is extended or adjusted under 35 U.S.C. 154(b) by 874 days.

(21) Appl. No.: 16/585,442

(22) Filed: Sep. 27, 2019

(65) Prior Publication Data

US 2020/0101666 A1     Apr. 2, 2020

Related U.S. Application Data

(60) Provisional application No. 62/737,548, filed on Sep. 27, 2018.

(51) Int. Cl.
| | |
|---|---|
| *B29C 64/245* | (2017.01) |
| *B29C 64/255* | (2017.01) |
| *B29C 64/232* | (2017.01) |
| *B29C 64/321* | (2017.01) |
| *B29C 64/205* | (2017.01) |
| B33Y 40/00 | (2020.01) |
| *B29C 64/153* | (2017.01) |
| B33Y 30/00 | (2015.01) |

(52) U.S. Cl.
CPC .......... *B29C 64/245* (2017.08); *B29C 64/205* (2017.08); *B29C 64/232* (2017.08); *B29C 64/255* (2017.08); *B29C 64/321* (2017.08); *B29C 64/153* (2017.08); *B33Y 30/00* (2014.12); *B33Y 40/00* (2014.12)

(58) Field of Classification Search
None
See application file for complete search history.

(56) References Cited

U.S. PATENT DOCUMENTS

| | | | | |
|---|---|---|---|---|
| 4,695,030 A | * | 9/1987 | Fischer | F16B 21/16 248/507 |
| 2006/0032838 A1 | * | 2/2006 | Muylaert | B29C 64/153 219/121.85 |
| 2007/0026099 A1 | * | 2/2007 | Hagiwara | B29C 64/153 425/174.4 |

(Continued)

Primary Examiner — Timothy Kennedy
(74) Attorney, Agent, or Firm — Seyfarth Shaw LLP (57) ABSTRACT

A standard powder bed fusion additive manufacture apparatus is provided with a device to modify the building space, including the powder feed for the building space, yielding a reduction in the active build area, with a concomitant reduction in the adjacent powder supply. A retrofit kit or assembly which is quickly emplaced on the existing equipment with little modification of the regular building space is provided, and is therefore readily removable when the building space is to be returned to its original condition. One advantage is the relatively quick manner in which the building space can be modified. A reduced area build piston is slideably received in a shaft depending from a cover that is emplaceable on the unmodified build area. The build piston moves with the pre-existing build platform. A like arrangement is provided for the feed container.

10 Claims, 5 Drawing Sheets

(56) References Cited

U.S. PATENT DOCUMENTS

2011/0252618 A1\* 10/2011 Diekmann ............ B29C 64/153
  29/401.1
2019/0126544 A1\* 5/2019 Martin Vidal ......... B33Y 40/00

\* cited by examiner

MODIFYING A BUILDING SPACE IN AN APPARATUS FOR POWDER BED ADDITIVE MANUFACTURING A THREE-DIMENSIONAL OBJECT

FIELD OF THE INVENTION

The invention relates to additive manufacture where an object is built up in layerwise fashion using a powder or similar fluent material, and more particularly to quickly modifying a building space of an apparatus for manufacturing three-dimensional objects by layerwise solidification of a powdery building material at locations corresponding to the object in the respective layers, so that a smaller area of the building space can be effectively and efficiently utilized in a build operation.

BACKGROUND

Machines for manufacturing three-dimensional objects by layerwise solidification of a powdery building material, for example in a laser sintering machine, may have a building area size of 250×250 mm, the EOSINT M270 being one example. Due to the size of this building space, such devices may be larger than necessary for manufacturing small objects, which do not require such a large build area. A larger than necessary amount of a powdery material may therefore be used for making smaller objects, wasting much of the powdery material. The economic efficiency of the machine is thereby reduced when manufacturing smaller objects.

SUMMARY OF THE DISCLOSURE

It is an object of the present invention to provide an apparatus for reducing the active building area of a machine having a larger standard build area, and concomitantly reducing the powder feed area, and to do so with a retrofit that can be quickly put in place and removed so as to return the machine back to the standard build area.

For example, the presently disclosed embodiments broadly comprises a device for modifying a build container and a related feed container of a powder bed fusion additive manufacture apparatus. This device reduces the size and surface area of the pre-existing build container, and may also do so for the feed container. A retrofit for the additive manufacture apparatus is particularly advantageous and accomplished by the invention. The area being actively used for building an object by layerwise manufacture is thereby reduced.

The "standard" or pre-existing additive manufacture apparatus has a build platform vertically movable in the build container and extending between sidewalls of the build container. The unmodified build container has an open top defining the size and surface area of the build container, and a feed platform vertically movable in a feed container between sidewalls of the feed container, the feed container having an open top defining the size and surface of the feed container. In one form of the present invention, a build piston having a top presenting a build surface upon which an object is built and a bottom is provided. The build surface thereby presented by the build piston has a horizontal area which is smaller than that of the build container surface area. A build piston attachment mechanism releasably affixes the bottom of the build piston to the build platform.

A build cover is sized to fit over the top of the unmodified build container. The build cover can have an aperture in which the top of the build piston is receivable, and a shaft depending from the aperture within which the build piston vertically moves. The shaft has sidewalls which are sealingly and slideably engaged by the piston. A build cover attachment mechanism releasably affixes the build cover in place on the build container.

The device may further include a feed piston having a top presenting a feed surface which is smaller than that of the surface of the feed container. The feed piston is locatable on the feed platform. A feed cover is sized to fit over the top of the feed container. The feed cover can have an aperture in which the top of the feed piston is receivable, and a shaft depending from the aperture within which the feed piston vertically moves. The shaft has sidewalls which are sealingly and slideably engaged by the feed piston. A feed cover attachment mechanism, which may be the same as that for the build piston, releasably affixes the feed cover in place on the build container.

In a preferred form of the invention, the build container and the feed container each present a top edge surrounding the top of the respective container, the respective cover overlying and resting upon the top edge. Further, the cover attachment mechanism can include quick release clamps which engage with the container sidewalls.

The above advantages and other advantages and objects of the present disclosure will be made further apparent and understood upon consideration of the following exemplary description, taken in conjunction with the drawings, in which:

DETAILED DESCRIPTION OF AN EMBODIMENT OF THE INVENTION

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "the invention" is not intended to limit the scope of the claimed invention and is instead a term used to discuss exemplary embodiments of the invention for explanatory purposes only.

Figure 1:
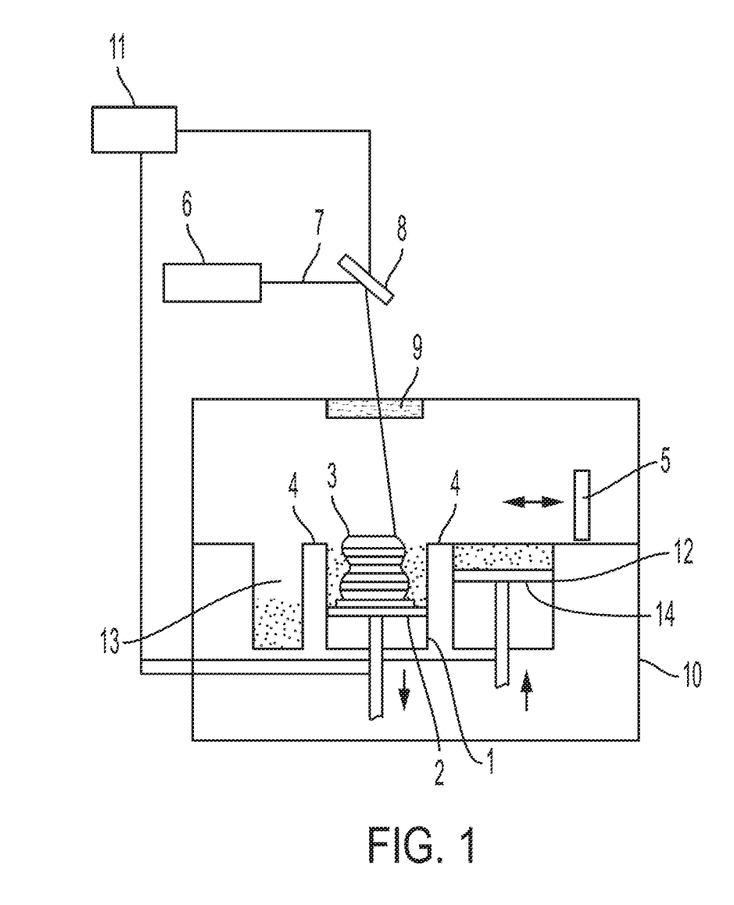
FIG. 1 schematically illustrates a typical AM apparatus using a powder material as the build material.

FIG. 1 shows a relatively "standard" type laser sintering apparatus as an example of an apparatus for layerwise manufacturing a three-dimensional object by means of a generative manufacturing method. It is understood that other terminology for describing this kind of additive manufacture is powder bed fusion, and selective laser sintering ("SLS"), where a powder (or similar fluent material) is spread over a build surface of a build area in the apparatus, and cross sections of an object (previously determined and reduced to a build file) are then fused, melted, and sintered one on top of the other to thereby unite to the previous layer and thereby generate the object (the build). The apparatus generally includes a frame 1, which opens on the top and forms a building chamber, and which includes therein a support in the shape of a building platform 2 which is moveable in the vertical direction and supports the three-dimensional object 3 to be manufactured to define a building field. The building platform 2 is adjusted in the vertical direction such that the layer of the object 3, which is to be solidified, lies within a building plane 4 (shown extending between the lead lines 4). Further, an application device 5 e.g., a blade, roller, sweeper, spreader etc., is provided for applying a powdery building material over the surface of the build area, which can be solidified by electromagnetic radiation, e.g. a laser.

An irradiation system includes a laser 6 as a source of the electromagnetic radiation. Further components of the irradiation system are a deflection means 8, e.g., a scanner, by which a laser beam 7 generated by the laser 6 is deflected to an injection window 9 from a process chamber 10 and focused to a predetermined point within the building plane 4. Further, a control unit 11 is provided, by which the components of the device are controlled in a coordinated manner for performing the building process. The control unit 11 is operated amongst others in accordance with computer-aided design ("CAD") data of the object to be manufactured. The additive manufacturing apparatus further includes a gas circulation and gas preparing system which is not shown. The foregoing components are typical, and well known in the art.

A powdery material is stored in the storage and metering container 12, which is the powder supply for the build. The material is moved upwardly and into position for transfer over the building field 4 by the application device 5 via a powder platform 14. In the illustrated embodiment, the powder material is provided in a container or build supply which is adjacent the build area. As the build platform 2 is gradually moved downwardly in the build process, the powder material in the powder supply container is moved upwardly by the powder platform 14. The spreader 5 then passes into the now-raised pile or supply of powder, to push it across the build surface 4, thereby making a fresh layer of unsolidified powder ready for the next cross section to be made.

Regarding the powdery material, any powder and/or powder mixture suitable for the laser sintering method may be used. Such powders include for example synthetic powders such as polyamide or polystyrene, Polyethyr ether ketone ("PEEK"), metal powders such as high quality steel powders or other metal powders which are adapted to the respective purpose, in particular alloys, as well as synthetic coated sand or ceramic powders.

During operation of the laser sintering device, the application device 5 is moved over the building field and applies a powder layer in a predetermined thickness. The overflow of powder is deposited in an overflow container 13. Thereafter, the cross section of the object 3 in the respective layer is irradiated by the laser beam 7, and the powder is solidified according to the cross section, fusing with the previous layer underneath.

Figure 2:
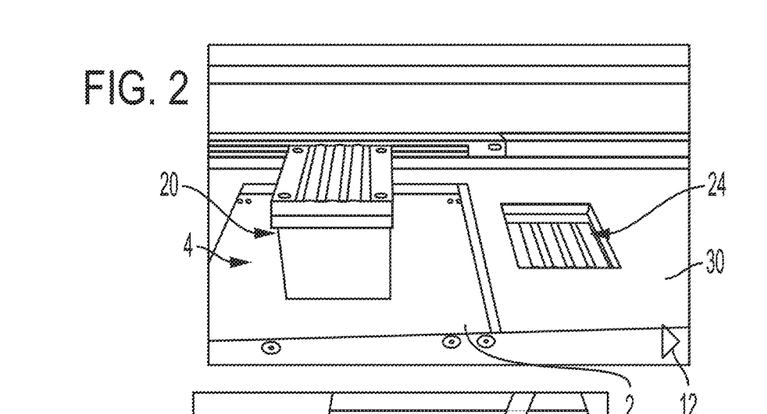
FIG. 2 is a perspective view of a standard build area modified by an embodiment of the invention.

FIG. 2 shows a view of a building area 4 of a standard powder bed fusion additive manufacturing apparatus of the foregoing type which has been retrofitted by an embodiment of the presently disclosed embodiments to modify the building space, including the powder feed 12 for the building space. Here, the modification can be a reduction in the active build area, with a concomitant reduction in the adjacent powder supply. In at least some embodiments, the term "retrofittable" can mean that the apparatus is operable without partitioning the regular building space, using a retrofit kit or assembly which is quickly emplaced on the existing equipment with little modification of the regular building space. The retrofit kit is therefore readily removable when the building space is to be returned to its original condition. In some embodiments the advantage to the retrofittable nature of the device is the relatively quick manner in which the building space can be modified.

Figure 3:
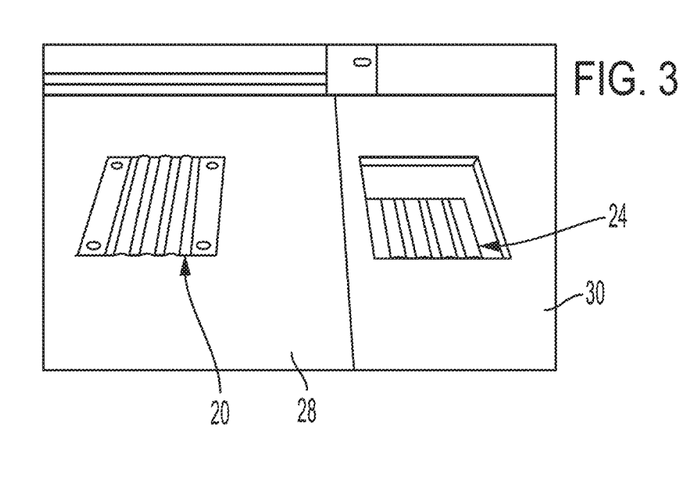
FIG. 3 is a view similar to that of FIG. 2 with two covers in place.

FIGS. 2 and 3 show a part piston element or cylinder 20 for the reduced build assembly which has been attached to the standard build plate or platform 2 (used in the normal build mode for the full build area). Adjacent is the complimentary feed powder piston element or cylinder 24, which is likewise attached to the standard feed plate or platform 14, or it can simply be located on the feed platform without any rigid affixation, as it will be positioned for use in the depending sleeve or shaft of the cover (described hereafter). These standard part and powder plates will function in the usual manner, except now each has its respective reduced-size piston thereon. Those pistons 20, 24 are aligned in covers 28, 30 which have apertures 52, 54 (e.g., see FIGS. 6a and 6b) sized to the circumferential shape of the top of the respective piston. The covers have depending shafts or sleeves 29, 31 which are integral to the covers, extending downwardly from the apertures 50, 52. The pistons fit within the respective shafts, with the seal 38 forming a slidable seal between the top plate 20b, 24b and the sidewall of the shafts 29,31. This contains powder within a telescoping arrangement.

Figure 4:
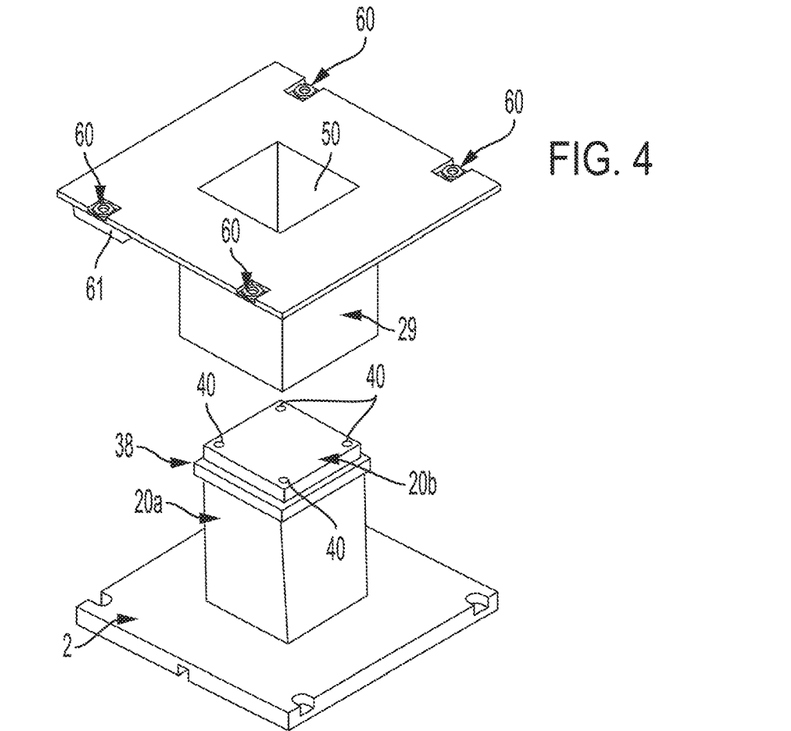
FIG. 4 is a slightly exploded perspective view of a device for modifying the build area.
Figure 5:
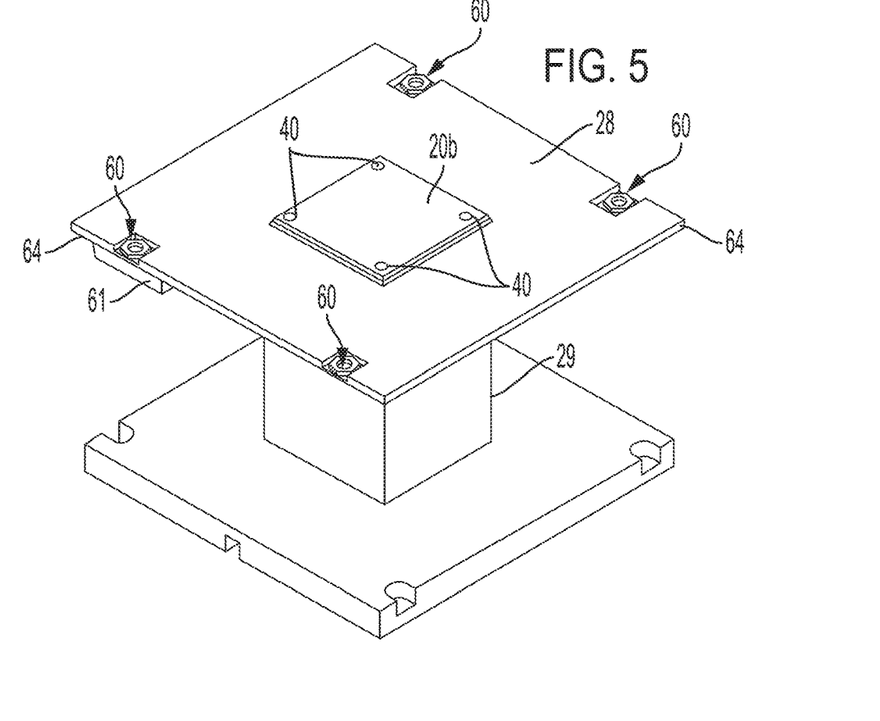
FIG. 5 is a perspective view similar to that of FIG. 4 of the assembled device for modifying the build area.
Figure 10:
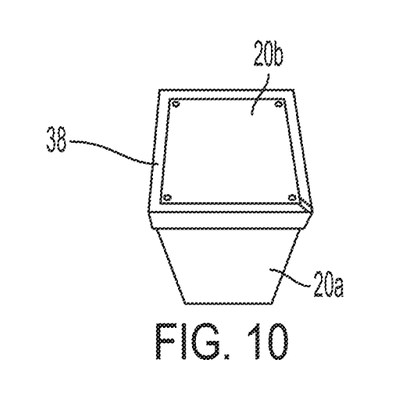
FIG. 10 is a top perspective view of a piston cylinder.
Figure 11:
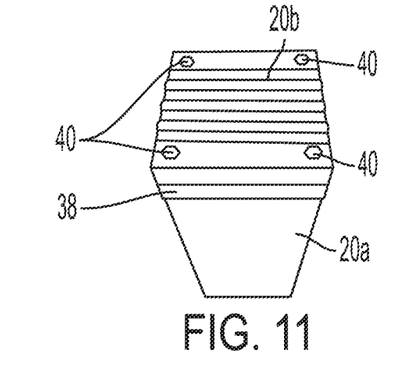
FIG. 11 is a view like that of FIG. 10 with the build plate in place.

Looking at FIGS. 4 and 5, the part piston 20 has a cylindrical body portion 20a and a build plate 20b at the top thereof. The feed piston 24 has a like cylindrical body portion 24a with a feed plate 24b at the top thereof (see FIG. 6B). A seal 38, here made of felt, is provided around the build/feed plate, to seal against the inside wall of the respective cover 28, 30 (see FIG. 10). The felt seals against the sidewalls of the shafts 29,31 as a gasket. It will be understood that the feed piston 24 is constructed in a similar manner. As further understood, the felt material is simply an example and any sealing material would be suitable. An attachment of the part/feed plate to its respective cylinder is made using screws or bolts 40, for instance (e.g., FIG. 11). The pistons 20, 24 can be made in advance of attachment to the machine.

Figure 8:
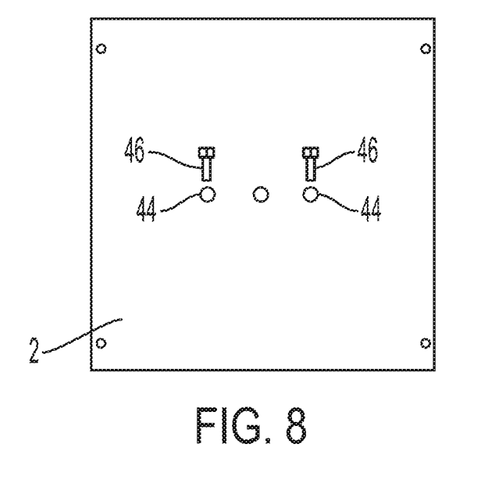
FIG. 8 is a bottom plan view of a build platform slightly modified for attachment of a piston cylinder.
Figure 9:
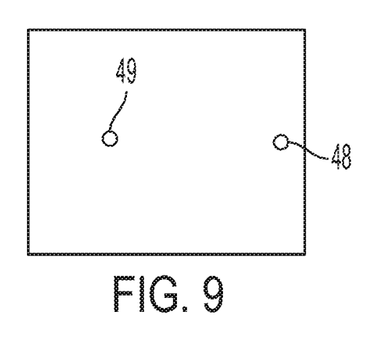
FIG. 9 is a bottom plan view of a piston cylinder showing attachment holes.

FIGS. 8 and 9 show how the piston cylinders are attached to the standard build/feed plates. The latter have been modified to have holes 44, here countersunk, to receive M6 screws 46 or the like through the bottom. Those screws 46 fit into threaded holes 48 provided in the cylinder bottoms, thus attaching the pistons to the standard size build plate. Two dowel pins can also be provided that go in dowel holes shown in FIGS. 8 & 9. These dowel pins may be used to allow more precise location and calibration of parts.

Turning to FIG. 3 for instance, the reduced area build piston 20 is placed in the fully raised position within the build chamber. This is the level point of the start of the build process. The reduced area feed piston 24 is placed in the lowermost position for the build (see also FIG. 6A). The covers are then put in place.

Figure 12:
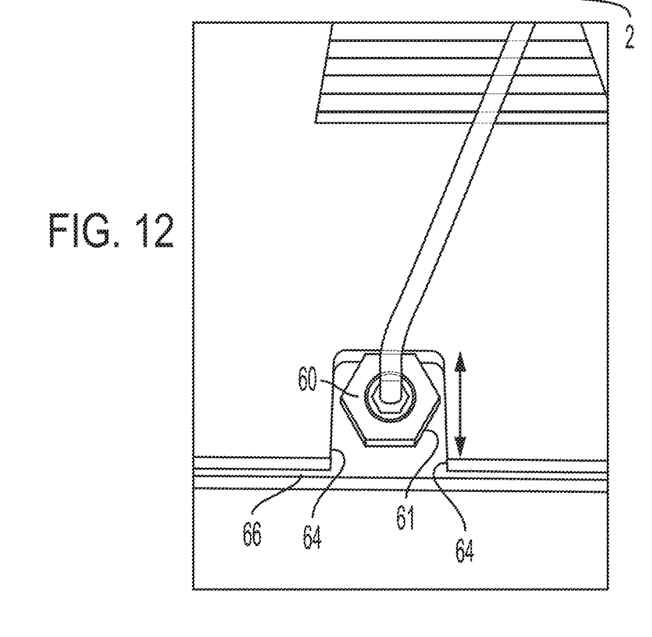
FIG. 12 shows an attachment clamp for a cover.
Figure 13:
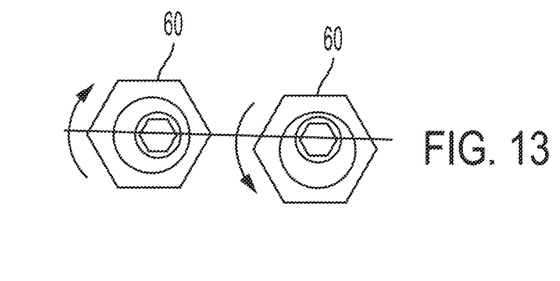
FIG. 13 illustrates how the attachment clamp works.

FIGS. 5, 12 and 13 details the cover attachment process. These covers 28, 30 have fixture clamps, here MITEE-BITE™ type clamps 60, which operate with a cam action, illustrated in FIG. 13. This kind of clamp has a rotatable part that rotates upon a pin, screw or the like that anchors the clamp to a surface, and has an offset element that can then be brought into engagement with an adjacent recess, wall or other structure. The clamps 60 are located in wells 61 formed in the covers. The clamps press flat against the side wall of the M290 when engaged. The covers have a shoulder 64 which overlies the edge 66 of the standard build chamber, so that it can be simply placed thereon. The shoulder 64 aligns the plate in the center of the side walls of the standard build chamber. The clamps 60 are then rotated to cam the washer associated therewith and fix the cover onto the build chamber sidewalls, thus quickly and easily putting the covers in place. It will be noted that the reduced feed assembly has the piston 24 offset relative to the center, bringing the feed closer to the reduced build area.

Figure 6A:
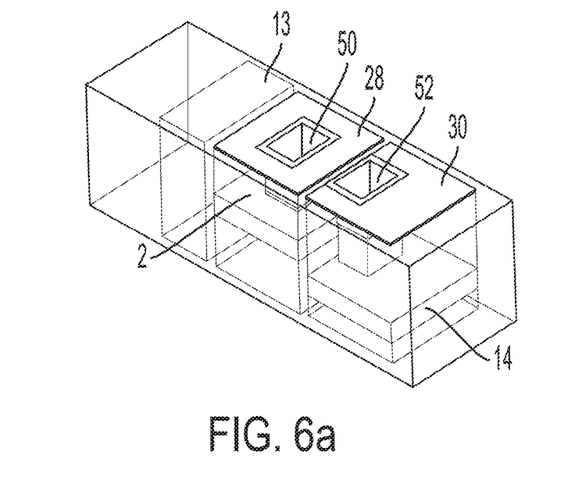
FIG. 6A is a somewhat schematic view showing modified build and feed areas at the start of the build process.
Figure 6B:
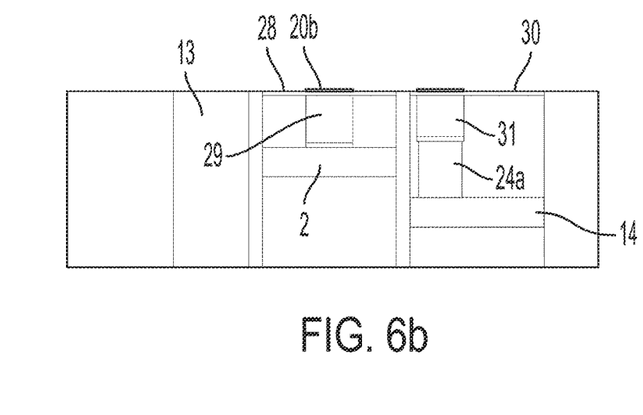
FIG. 6B is a schematic view of the arrangement of FIG. 6a but in side elevation.
Figure 7A:
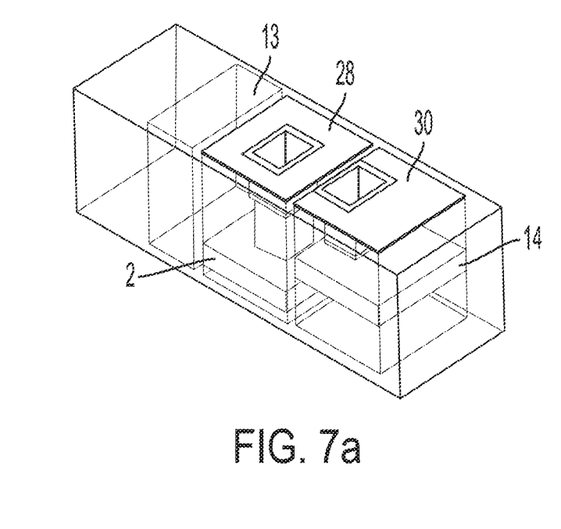
FIG. 7A is a somewhat schematic view showing the modified build and feed areas at the conclusion of the build process.
Figure 7B:
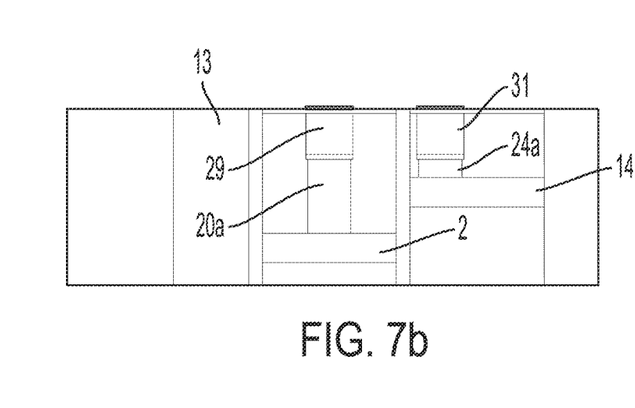
FIG. 7B is a schematic view of the arrangement of FIG. 7a but in side elevation.

Feed powder is then added to fill the feed container portion (i.e., the inside of the shaft 31 associated with the feed piston, the latter being in the lowermost position for the start of the build) (see, for example, FIG. 6A). The additive manufacturing process proceeds with the retrofitted reduced build area, of course with the programming modified to accommodate the changed dimension of the build and powder feed areas. This is illustrated in FIGS. 6A, 6B, 7A and 7B. FIGS. 6A and 6B show the start of the build, and FIGS. 7A and 7B show the end positions of the build.

The manufacturing process is performed in an analogous manner to the previously described manufacturing process of the unmodified build area. The control unit 11 is of course programmed for the now-modified and smaller building area being actively used.

Thus, while the invention has been described in relation to a particular embodiment, the matter set forth in the foregoing description and accompanying drawings is offered by way of illustration only and not as a limitation. While a particular embodiment has been shown and described, it will be apparent to those skilled in the art that changes and modifications may be made without departing from the broader aspects of the inventors' contribution. The actual scope of the protection sought is intended to be defined in claims as allowed, when viewed in their proper perspective based on the prior art.

What is claimed is:

1. A device for modifying a build container of a powder bed fusion additive manufacture apparatus to reduce a size and surface area of the build container being actively used for building an object by layerwise manufacture, the additive manufacture apparatus having a build platform vertically movable in the build container and extending between sidewalls of the build container, the build container having an open top defining the size and surface area of the build container, the device comprising:

a build piston having a top presenting a build surface upon which the object is built and a bottom, the build surface having a horizontal area which is smaller than that of the build container surface area;

a build piston attachment mechanism releasably affixing the bottom of the build piston to the build platform;

a build cover sized to fit over the top of the build container, the build cover having an aperture in which the top of the build piston is receivable, and a shaft depending from the aperture within which the build piston vertically moves, the shaft having sidewalls which are sealingly and slideably engaged by the piston;

a build cover attachment mechanism releasably affixing the build cover in place on the build container, wherein the build container presents a top edge surrounding the top of the build container, the cover overlying and resting upon the top edge, the build cover attachment mechanism comprising quick release clamps which engage with the build container sidewalls, and further wherein the quick release clamps each comprise an element rotatably mounted on the cover so as to present a portion of the clamp accessible on a top of the cover which can be rotated to extend an element of the clamp outboard from the cover when rotated to contact one of the build container sidewalls upon rotation in a static fit to fix the cover removably in place.

2. The device of claim 1, wherein the build container sidewall includes a recess which receives the element of the quick release clamp therein to engage with the build container sidewall.

3. The device of claim 1, wherein the manufacture apparatus further includes:

a feed container for powder material used in building the object, and a feed platform vertically movable in the feed container and extending between sidewalls of the feed container, the feed container having an open top defining a size and surface of the feed container, the device for modifying further including a feed piston having a top presenting a feed surface which is smaller than that of the surface of the feed container, the feed piston being locatable on the feed platform;

a feed cover sized to fit over the top of the feed container, the feed cover having an aperture in which the top of the feed piston is receivable, and a shaft depending from the aperture within which the feed piston vertically moves, the shaft having sidewalls which are sealingly and slideably engaged by the feed piston; and a feed cover attachment mechanism releasably affixing the feed cover in place on the build container.

4. The device of claim 3, wherein the feed container presents a top edge surrounding the top of the feed container, the cover overlying and resting upon the top edge, the feed cover attachment mechanism comprising quick release clamps which engage with the feed container sidewalls, the build container sidewalls include recesses within which the element engages upon rotation to place part of the element within one of the recesses, the element engaging within the recess in a static fit to fix the cover removably in place.

5. The device of claim 1, wherein the build piston further includes a build plate which is attached to the top of the build piston, and the build plate thereby functioning as the build surface upon which the object is built.

6. The device of claim 3, wherein the feed piston further includes a feed plate which is attached to the top of the feed piston, and the feed plate thereby functioning as the feed surface upon which material to be used in the build process is carried.

7. A retrofit device for modifying a build container and a related feed container of a powder bed fusion additive manufacture apparatus to reduce a size and surface area of the build container and the feed container being actively used for building an object by layerwise manufacture, the additive manufacture apparatus having a build platform vertically movable in the build container and extending between sidewalls of the build container, the build container having an open top defining the size and surface area of the build container, and a feed platform vertically movable in the feed container between sidewalls of the feed container, the feed container having an open top defining a size and surface of the feed container, the retrofit device comprising:

a build piston having a top presenting a build surface upon which the object is built and a bottom, the build surface having a horizontal area which is smaller than that of the build container surface area;

a build piston attachment mechanism releasably affixing the bottom of the build piston to the build platform;

a build cover sized to fit over the top of the build container, the build cover having an aperture in which the top of the build piston is receivable, and a shaft depending from the aperture within which the build piston vertically moves, the shaft having sidewalls which are sealingly and slideably engaged by the piston;

a build cover attachment mechanism releasably affixing the build cover in place on the build container;

a feed piston having a top presenting a feed surface which is smaller than that of the surface of the feed container, the feed piston being locatable on the feed platform;

a feed cover sized to fit over the top of the feed container, the feed cover having an aperture in which the top of the feed piston is receivable, and a shaft depending from the aperture within which the feed piston vertically moves, the shaft having sidewalls which are sealingly and slideably engaged by the feed piston; and a feed cover attachment mechanism releasably affixing the feed cover in place on the build container, wherein the build container and the feed container each present a top edge surrounding the top of the respective container, the respective cover overlying and resting upon the top edge, the cover attachment mechanism comprising quick release clamps which engage with the container sidewalls, the quick release clamps each present a portion of the clamp accessible on a top of the cover which can be rotated to extend an element of the clamp outboard from the cover when rotated, the element engaging with the sidewall in a static fit to fix the cover removably in place.

8. A device for modifying a build container of a powder bed fusion additive manufacture apparatus to reduce a size and surface area of the build container being actively used for building an object by layerwise manufacture, the additive manufacture apparatus having a build platform vertically movable in the build container and which extends between sidewalls of the build container, the build container having an open top defining the size and surface area of the build container, the device comprising:

a build piston having a top presenting a build surface upon which an object is built, and a build piston bottom, the build surface of the build piston having a horizontal area which is smaller than that of the build container surface area;

a build piston attachment mechanism releasably affixing the bottom of the build piston to the build platform;

a build cover sized to fit over the top of the build container, the build cover having an aperture in which the top of the build piston is receivable, and a shaft depending from the aperture within which the build piston vertically moves, the shaft having sidewalls which are sealingly and slideably engaged along sidewalls of the piston; and at least one build cover attachment mechanism releasably affixing the build cover in place on the build container with the build piston received within the build cover shaft, whereby the surface area of the build container being actively used for building an object is reduced to an area of the build surface of the build piston, wherein the build container presents a top edge shoulder surrounding the top of the build container, the cover overlying and resting upon the shoulder, the build cover attachment mechanism comprising quick release clamps on at least two opposite sides of the cover which engage with the container sidewalls, the quick release clamps each comprise a portion accessible on a top surface of the cover which is engaged in use to extend an element outboard from the cover when rotated, the container sidewalls having a part which an element engages upon rotation placing part of the element, the element engaging in a static fit to fix the cover removably in place.

9. The device of claim 8, wherein the quick release clamps each comprise an element rotatably mounted on the cover to extend outboard from the cover when rotated, the container sidewalls including recesses within which an element engages upon rotation to place part of the element within the recess, the element engaging within the recess in a static fit to fix the cover removably in place.

10. The device of claim 8, wherein the manufacture apparatus further includes:

a feed container for powder material used in building the object, and a feed platform vertically movable in the feed container and extending between sidewalls of the feed container, the feed container having an open top defining the size and surface of the feed container, the device for modifying further including a feed piston having a top presenting a feed surface which is smaller than that of a surface of the feed container, the feed piston being locatable on the feed platform; and a feed cover sized to fit over the top of the feed container, the feed cover having a feed cover aperture in which the top of the feed piston is receivable, and a feed cover shaft depending from the feed cover aperture within which the feed piston vertically moves, the shaft having sidewalls which are sealingly and slideably engaged along sidewalls of the feed piston, and a feed cover attachment mechanism releasably affixing the feed cover in place on the build container, whereby the surface area of the feed container being actively used in building an object is reduced to an area of the feed piston top, wherein the feed container presents a top edge shoulder surrounding the top of the feed container, the cover overlying and resting upon the feed container shoulder, the feed cover attachment mechanism comprising quick release clamps which engage with the feed container sidewalls, the quick release clamps each comprise a portion that is freely accessible on a surface of the cover which when engaged has an element that extends outboard from the feed cover when rotated, the element engaging with an adjacent sidewall in a static fit to fix the feed cover removably in place.

\* \* \* \* \*